United States Patent [19]

Bischoff

[11] 4,412,603
[45] Nov. 1, 1983

[54] DUAL PRESSURE, DUAL PISTON ACTUATOR

[75] Inventor: Andrea L. Bischoff, Akron, Ohio

[73] Assignee: Goodyear Aerospace Corporation, Akron, Ohio

[21] Appl. No.: 334,706

[22] Filed: Dec. 28, 1981

[51] Int. Cl.³ .............................................. F16D 65/22
[52] U.S. Cl. ................................. 188/106 P; 188/72.4
[58] Field of Search .............. 188/72.4, 106 R, 106 A, 188/106 P, 345; 60/484, 581; 303/6 C

[56] References Cited

U.S. PATENT DOCUMENTS

| | | | |
|---|---|---|---|
| 3,312,313 | 4/1967 | Moyer | 188/106 P |
| 3,511,346 | 5/1970 | Schlitz | 188/106 R X |
| 3,741,354 | 6/1973 | Ooka et al. | 188/106 P X |
| 3,773,148 | 11/1973 | Jean-Claude et al. | 188/106 P X |

Primary Examiner—Duane A. Reger
Attorney, Agent, or Firm—L. A. Germain; P. E. Milliken

[57] ABSTRACT

A hydraulic actuator comprises a first piston mounted within a primary bore and moved in response to a low pressure force while a second piston is mounted in an axially aligned secondary bore and is moved in response to a high pressure force. The second piston engages the axially aligned first piston and both are moved under the influence of the high pressure while the first piston only is moved by the influence of the low pressure force. The piston areas are in proportion to each other as the separate pressure forces so as to provide a substantially equal output actuating force irrespective of the actuating pressure.

7 Claims, 3 Drawing Figures

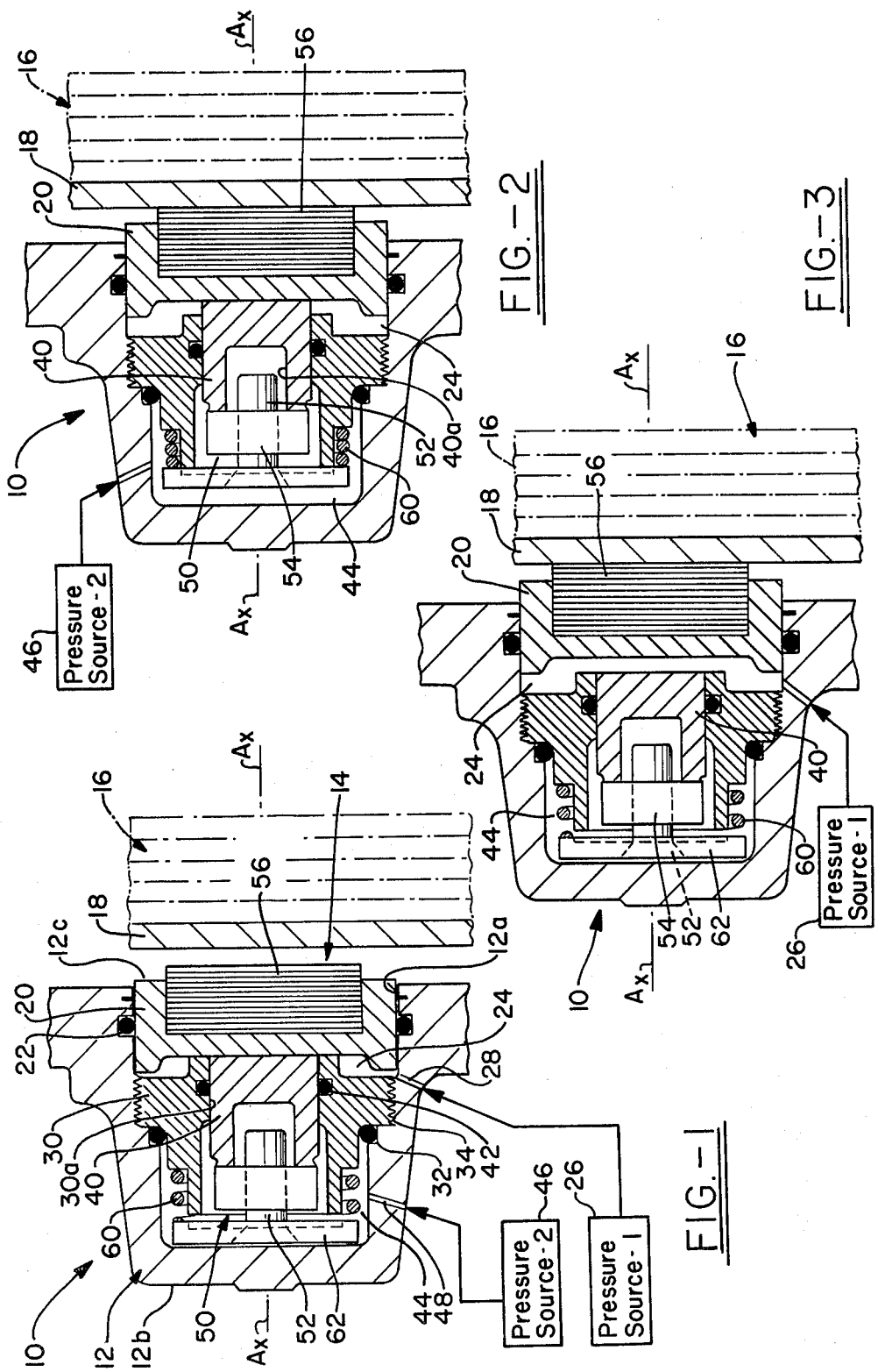

DUAL PRESSURE, DUAL PISTON ACTUATOR

BACKGROUND OF THE INVENTION

This invention generally relates to hydraulic actuators and more particularly to a disk brake actuator as may be applied to aircraft type disk brake assemblies.

Disk brake assemblies of the type alluded to are conventionally full circle configurations which incorporate at least two piston actuators in a balanced arrangement about the circle and which operate to move a pressure plate into engagement with a disk brake stack comprised of alternating stationary and rotating disk elements. The piston actuators conventionally operate under the influence of a single hydraulic pressure, and in systems wherein it is desired to provide emergency and/or parking brake capabilities these are provided by separate hydraulic and/or mechanical apparatus.

This invention provides, within a single actuator, both a high pressure and a low pressure actuating capability without affecting the deceleration ability of a disk brake system. The invention also eliminates the need for separate emergency and/or parking brake mechanisms and thus eliminates the additional weight of these separate apparatus. The present invention further provides a manual low pressure back-up braking capability without degrading the overall braking performance of the system. While the invention is described with respect to an aircraft disk brake application, it is not limited to such application but may be applied to any application wherein a dual pressure actuation is desired.

SUMMARY OF THE INVENTION

The beforementioned and other advantages of the invention are provided in an actuator comprising a pair of pistons in a single housing wherein a first piston is mounted within a primary bore and is moved in response to a low pressure hydraulic force while a second piston is mounted in an axially aligned secondary bore and is moved in response to a high pressure hydraulic force and the areas of the pistons are in proportion to their respective pressures to proved substantially the same actuating output force irrespective of the pressure applied.

DESCRIPTION OF THE DRAWINGS

Various objects and advantages of the invention will become more apparent and fully understood and appreciated from a consideration of the following description when taken in conjunction with the accompanying drawings in the several figures of which like reference numerals indicate like elements and in which:

FIG. 1 is a sectional elevational view of the actuator of this invention showing the actuator as it may be applied to a disk brake application and in a "brake disengaged" position;

FIG. 2 is a sectional elevational view similar to FIG. 1 showing the actuator in the "brake engaged" position by reason of a pressure force supplied by a high pressure source; and FIG. 3 is a sectional elevational view similar to FIG. 1 showing the actuator in the "brake engaged" position by reason of a pressure force supplied by a low pressure source.

DETAILED DESCRIPTION OF THE INVENTION

With reference to the drawings, an actuator in accordance with this invention is generally indicated by reference numeral 10. The actuator 10 includes a housing 12 having a central axis Ax and configured to define a primary bore 12a having a closed end 12b and an open end 12c. The bore 12a is adapted for receiving a piston means generally indicated by reference numeral 14 and which, upon fluid pressure actuation, may be applied to engage a disk brake stack 16 (shown only partially via ghost lines) through a pressure plate 18.

The piston means 14 comprises a first piston 20 slidably mounted in the bore 12a at the open end thereof and pressure sealed therein by an annular seal 22. An insert member 30 is also mounted within the bore 12a at the approximate midsection of the housing 12 and is retained in the bore 12a by reason of threads 34. The insert 30 defines an axially aligned secondary bore 30a that receives a second piston 40 in a sliding relationship, which piston 40 is pressure sealed by an annular seal 42. The insert 30 may also be pressure sealed by an annular seal 32. The second piston 40 is thus positioned within the housing 12 toward the closed end thereof and is adapted to engage the first piston 20 when influenced to move under the force of a fluid pressure.

In the configuration hereinbefore described, the pistons 20,40 in combination with the sleeve 30 define two pressure chambers. A first pressure chamber 24 is defined by the inwardly facing surface of the piston 20 and the combined outwardly facing surfaces of the piston 40 and the sleeve 30. Pressure chamber 24 is connected to a first source of hydraulic fluid pressure 26 through a suitable access port 28 in the housing 12. A second pressure chamber 44 is defined by the closed end 12b of the housing and the combined inwardly facing surfaces of the piston 40 and the sleeve 30. The chamber 44 is connected to a second source of hydraulic fluid pressure 46 through a suitable access port 48 in the housing 12.

The piston 40 may be spring biased toward the closed end 12b of the housing and this is accomplished by a compression spring 60 that is mounted between the inside end of the insert 30 and a spring retaining cap 62, the cap 62 being fastened to the inside end of the piston 40 via a bolt or pin 52. The spring bias overcomes back pressure typically found in power assisted hydraulic systems and thus prevents piston 40 from exerting force on piston 20 causing actuation and brake drag when brake application is not desired.

In operation and with reference to FIG. 2, the hydraulic pressure source 46 is a high pressure power-assisted system as may be found in aircraft applications and operating at a pressure of between 200–2500 psi. Upon application of the system pressure, piston 40 is driven toward the open end 12c of the housing 12, engages the first piston 20 which in turn is driven into engagement with the brake stack 16 through the pressure plate 18 and braking is effected. In the event that insufficient pressure from the high pressure power assisted system is available for actuation of the brake due to system failure, then the manual or low pressure actuation of the brake is available as illustrated in FIG. 3. In this circumstance, the first pressure source 26, which operates at an approximate maximum pressure of 500 psi and is the nominal pressure of a typical master cylinder system, is activated and piston 20 is moved into engagement with the brake stack through the pressure plate 18.

It will now be appreciated by those persons skilled in the art that the areas of the pistons 20,40 and the pressures available in the chambers 24,44 due to the sources 26,46 may be so chosen that the resultant output force on the pressure plate 18 is substantially the same irrespective of which system is operating. In other words, the areas of the pistons 20,40 are in approximately the same proportion to one another as the pressures available in the chambers 24,44 and since Force=Pressure×Area each actuating system has the capability of applying the same force F to the disk stack 16 through the pressure plate 18 and therefor offering the same braking performance.

Because the invention is primarily adapted for disk brake applications, an automatic brake wear adjuster may be included as part of the mechanism. While there are many and various type brake adjusters known in the art, this invention includes a simple brake wear adjusting device 50 which may be readily mounted at the inside end of the piston 40. The adjuster 50 comprises the pin 52 that is frictionally engaged through a collar 54 threadably mounted at the end of the piston 40. In this configuration, the piston 40 is provided with a bore 40a within the back end thereof which readily receives the pin as it advances in response to brake wear takeup. This type operation is considered conventional in the art and further elaboration is not deemed necessary.

Further, and for the purpose of heat isolation, the actuator 10 may include an insulator 56 mounted at the forward end of the first piston 20. Any type of suitable material may be used for this purpose and this is well within the skill of the art.

Thus, it will be appreciated that this invention provides a dual pressure actuation in a very compact apparatus. This is a marked advantage in an aircraft brake application wherein a plurality of such actuators are utilized to activate a full circle disk brake assembly and wherein compactness and weight are of primary importance and concern.

While certain representations and details have been shown and described for the purpose of illustrating the invention, it will be apparent to those skilled in this art that various changes and modifications may be made therein without departing from the spirit or scope of the invention.

What is claimed is:

1. A dual source hydraulic actuator comprising:
   a housing defining a primary bore having a closed end and an open end and a central axis;
   a first piston slidably and sealingly mounted within the primary bore toward the open end thereof to move axially within the bore;
   an insert threadably received within the primary bore and inwardly with respect to the first piston, said insert defining a secondary bore axially aligned with respect to said primary bore;
   a second piston slidably and sealingly mounted within the secondary bore to move axially within the bore, said insert and second piston defining a first pressure chamber with respect to the first piston and defining a second pressure chamber with respect to the closed end of the housing;
   a first source of hydraulic fluid pressure communicating with the first chamber to provide a pressure force on the first piston; and
   a second source of hydraulic fluid pressure communicating with the second chamber to provide a pressure force on the second piston; said second piston movable only in response to a fluid pressure from the second source to move said second piston into engagement with the first piston, both said pistons thus responding to the second source to provide an output actuating force, said first piston being solely and separately movable in response to the first source of fluid pressure to provide a substantially equal output actuating force.

2. The actuator as set forth in claim 1 wherein said pistons have areas with respect to each other in the same proportions as the pressure sources to provide the substantially same actuating output force irrespective of which piston/pressure source combination is in operation.

3. The actuator as set forth in claim 2 wherein the actuator is associated with an aircraft disk brake system and the first pressure source is a master cylinder system providing a hydraulic pressure of approximately 500 psi while said second pressure source is a high pressure power-assisted system providing a hydraulic pressure of between 200–2500 psi.

4. The actuator as set forth in claim 3 wherein an adjuster is mounted to the back side of the second piston to provide an automatic brake wear adjustment and to maintain the second piston travel the same irrespective of brake wear.

5. The actuator as set forth in claim 4 wherein a compression spring is mounted rearwardly with respect to the second piston to provide a reverse bias on said second piston.

6. The actuator as set forth in claim 5 wherein said second piston has an axial bore within its rearward end to receive a pin therein associated with the brakewear adjuster, said pin mounted through a friction sleeve threadably received on the end of the second piston and fastened through an end plate which serves as a retainer for the compression spring.

7. The actuator as set forth in claim 6 wherein the first piston has an insulator mounted at its forward end to isolate the actuator from heat generated in the braking operation.

* * * * *